United States Patent [19]

Nishizawa et al.

[11] Patent Number: 5,364,168
[45] Date of Patent: Nov. 15, 1994

[54] RETRACTOR SHAFT-ROTATING TYPE SEAT BELT PRETENSIONER

[75] Inventors: Muneo Nishizawa; Tetsuya Hamaue, both of Shiga, Japan

[73] Assignee: Takata Corporation, Tokyo, Japan

[21] Appl. No.: 990,637

[22] Filed: Dec. 14, 1992

[30] Foreign Application Priority Data

Dec. 17, 1991 [JP] Japan .................................. 3-353002

[51] Int. Cl.⁵ .................................................. B60R 22/46
[52] U.S. Cl. .................................... 297/476; 297/479
[58] Field of Search ............... 297/479, 480, 474–476, 297/478; 280/806; 242/107

[56] References Cited

U.S. PATENT DOCUMENTS

| | | | |
|---|---|---|---|
| 4,925,212 | 5/1990 | Motozawa | 297/480 X |
| 4,932,722 | 6/1990 | Motozawa | 297/480 |
| 5,160,168 | 11/1992 | Nishizawa et al. | 297/480 X |

FOREIGN PATENT DOCUMENTS 1119454  5/1989  Japan .

WO8700809  2/1987  WIPO .

Primary Examiner—Kenneth J. Dorner
Assistant Examiner—Milton Nelson, Jr.
Attorney, Agent, or Firm—Brumbaugh, Graves, Donohue & Raymond

[57] ABSTRACT

A retractor shaft-rotating type seat belt pretensioner for imparting pretension to a seat belt by rotating the take-up shaft of a belt retractor comprises a driving member engageable with a driven member on the take-up shaft and a power source coupled to the driving member and adapted to rotate the driving member by applying an operating force to it at an operating point. A guide surface supports the driving member at a reaction support point against the reaction force due to a rotary moment applied to the driving member at an engaging point where the driving member engages the take-up reel, the reaction support point being on the opposite side of the engaging point from the operating point where the operating force of the power source acts on the driving member.

2 Claims, 6 Drawing Sheets

RETRACTOR SHAFT-ROTATING TYPE SEAT BELT PRETENSIONER

BACKGROUND OF THE INVENTION

The present invention relates to a vehicle seat belt pretensioner and, in particular, to a pretensioner of the type that pretensions the belt by rotating the take-up shaft of a belt retractor.

In some vehicle seat belt systems, a pretensioner is provided for tightening the belt so that it firmly engages the occupant in a collision before the occupant is thrown forward. One type of seat belt pretensioner is disclosed in the Japanese Patent Laid-Open Publication No. 1-119454.

In that pretensioner, a pulley is connected to a take-up shaft of a seat belt retractor through a coupling device, and the pulley is rotated by a cable, which is wound around the pulley and is pulled by means of a drive unit (power source). The coupling device comprises a pair of gears, one of which is fixed on the retractor take-up shaft and the other of which is fixed on the pulley. The pulley is supported on a guide unit in the form of a pivoting arm. In the set position, the guide unit is maintained by a shear pin in a position in which the gears are not engaged. When the drive unit is operated, the shear pin is broken stepwise, first to allow the guide unit to pivot and then to allow the pulley to rotate. After the two gears are engaged with each other by swinging of the guide unit, the pulley is rotated and imparts rotation to the take-up shaft so as to wind a length of the belt onto the belt reel.

In the unit described above, the rotation of the pulley gear must be restricted before the two gears are engaged with each other, and this requires a high-precision holding device (i.e., a shear pin with accurate shear load) operating in two steps. Also, because the device provides high power instantaneously, in the order of milliseconds, even slight resistance may exert a strong influence on the operation of the unit. Because the pulley is supported by the guide device, a sturdy guide device matching the applied power is required, and a high power loss occurs in moving the guide device.

SUMMARY OF THE INVENTION

To solve the above problems, it is an object of the present invention to provide a retractor shaft-rotating type seat belt pretensioner in which engagement of the take-up shaft by a driving member is based solely on the function of the driving member and the engagement is maintained by fixed guiding means. A further object is to eliminate the need to provide stepwise control of the engagement of a driving member with a retractor take-up shaft and the rotation of the driving member. It is also an object to attain more efficient operation by not requiring a movable guiding means and by minimizing the size and number of components driven by the power source.

To attain the above objects, there is provided, in accordance with the present invention, a retractor shaft-rotating type seat belt pretensioner for imparting pretension to a seat belt by rotating the take-up shaft of a belt retractor. The pretensioner includes a driving member engageable with the take-up shaft and a power source coupled to the driving member and adapted to rotate the driving member by applying an operating force to it at an operating point. The invention is characterized in that a fixed guide surface supports the driving member at a fixed reaction support point against the reaction force due to a rotary moment applied to the driving member at an engaging point where the driving member engages the take-up reel, the reaction support point being on the opposite side of the engaging point from the operating point where the operating force of the power source acts on the driving member.

In the pretensioner of the present invention, the driving member is moved by the operating force of the power source when it is operated and engages the driving member with a driven member on the take-up shaft. Upon the engagement, the operating point of the force of the power source acting on the driving member moves closer to the take-up shaft. A rotational moment is generated in the driving member, with the engaging point between the driving member and the take-up shaft as the center. Because this rotary moment is supported by the reaction support point on the pretensioner body, a force acting in the direction of the take-up shaft is applied at the engaging point between the acting point of the operating force and the fixed reaction support point. The driving member is guided by the guiding means while maintaining engagement with the take-up shaft of the retractor and is rotated, thereby maintaining the engaging point at a fixed point. Therefore, rotating power imparted to the driving member by the power source is transmitted to the take-up shaft of the retractor through the driving member. As the belt is retracted by rotation of the take-up shaft, pretension is provided by tightening of the seat belt.

For a better understanding of the invention, reference may be made to the following description of exemplary embodiments, taken in conjunction with the accompanying drawings.

DESCRIPTION OF THE EMBODIMENTS

Figure 1:
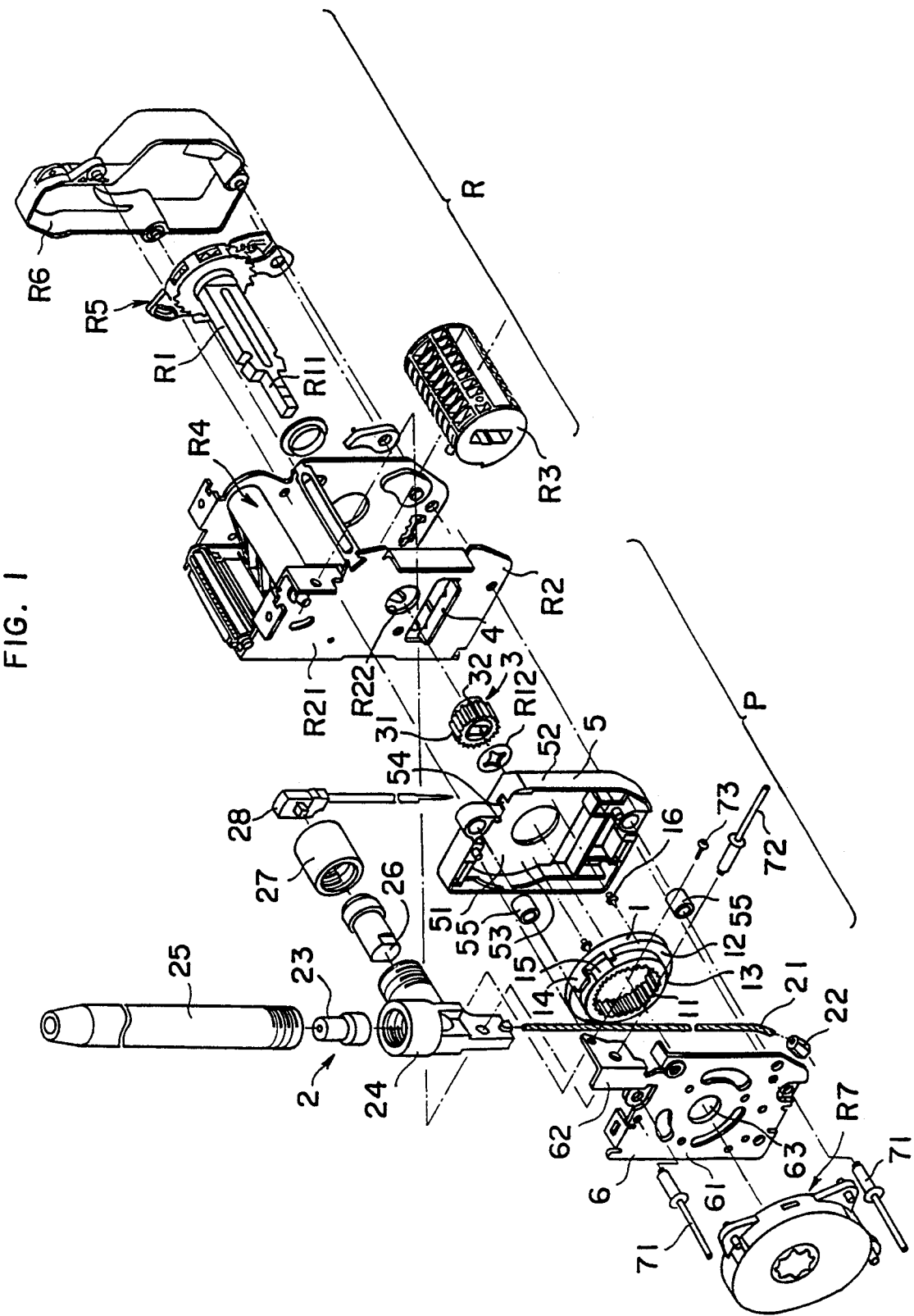
FIG. 1 is an exploded perspective view of a first embodiment of the present invention, in which the pretensioner is integrated with a retractor.
Figure 2:
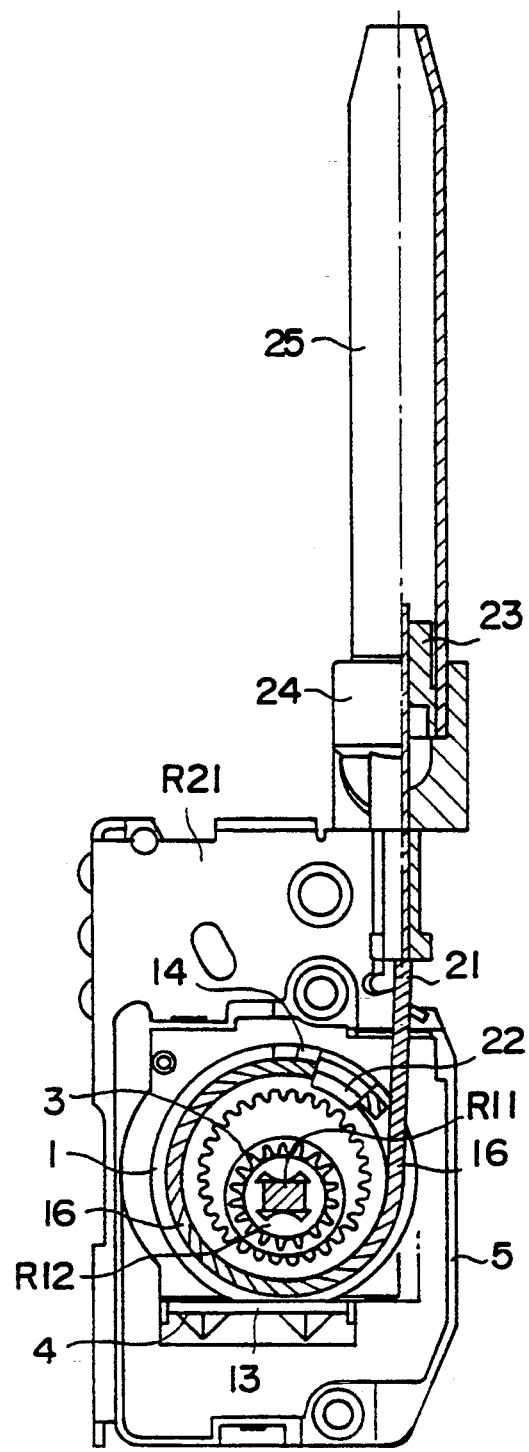
FIG. 2 is a cross-sectional side view of a part of the first embodiment of the invention.
Figure 3:
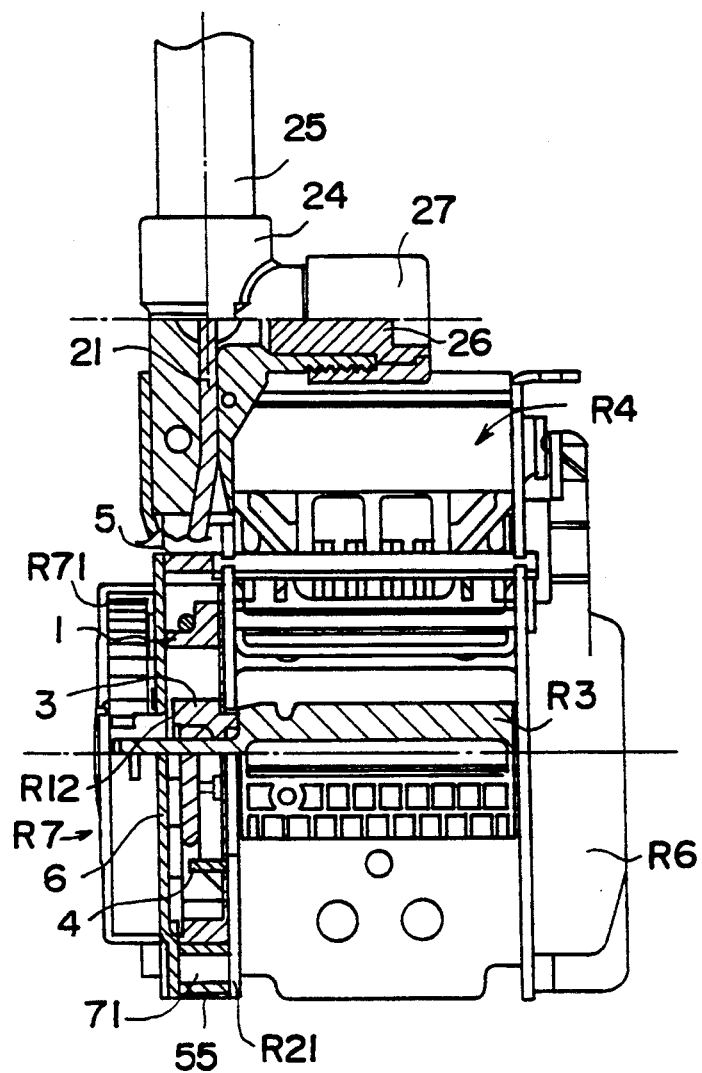
FIG. 3 is a cross-sectional front view of a part of the first embodiment.

In the embodiment of FIGS. 1 to 5, a pulley 1, i.e., a driving member, engages and rotates a take-up shaft R1 of a seat belt retractor R through a pinion 3 fixed on the shaft upon operation of a power source 2. Upon rotation of the shaft, a seat belt (not shown) is tightened by winding a length of it onto the retractor belt reel R3. On a frame R2 of the retractor R, which also serves as a frame for the pretensioner P, there is provided a guiding means 4, i.e., a fixed reaction support point, to support the pulley against a rotational moment exerted on the pulley by the operating force of the power source 2 and having as its center the engagement point between the pulley and the pinion. The guiding means 4 is on the opposite side of the engagement point from the operating point where the force of the power source is exerted on the pulley. In the embodiment, the guiding means 4 comprises a planar flange, which is cut and bent out from a side wall R21 of the base R and supports the pulley 1 at the peripheral surface of the pulley.

The seat belt retractor R may be of any suitable construction, many of which are well known. In the embodiment, the retractor R has a U-shaped frame R2, a reel R3, on which the seat belt (not shown) is wound, and a clamp assembly R4 for clamping the belt. A reel-shaft locking mechanism R5 is mounted on one side flange of the frame R2 and is covered by a cover R6. A spring unit R7 for winding the belt onto the reel is provided on the other side flange R21 of the frame. The pretensioner mechanism P of the present invention is arranged between the side flange R21 of the frame R2 and the spring unit R7 and comprises a pinion 3, a pulley 1, a housing 5, a retainer 6 for supporting the spring unit R7, and the power source 2, which is mounted on the retainer 6.

The housing 5 has a side wall 51 and a peripheral wall 52, which form a recess 53 of substantially rectangular shape for receiving the pulley and is of a box shape with one side open. At the center of the side wall 51, there is a hole for receiving the pinion 3, and a part of the peripheral wall 52 is cut out to form a notch 54 for the cable 21 of the power source 2. The retainer 6, which covers the open side of the housing 5, is of generally planar shape and is made by stamping. The spring unit R7 is attached to the planar body 61, and the power source 2 is attached on a flange 62 that extends from the edge of the body 61. The housing 5 is mounted on the side flange R21 of the frame R2 through spacer collars 55, and the housing 5 and the retainer 6 are attached to the frame R2 by rivets 71.

The pinion 3 has external teeth 31, is engaged with and fixed on a rectangular portion R11 on the end of the take-up shaft R1, and is located approximately at the center of the pulley-receiving recess 53 of the housing 5. A circular cylindrical boss 32 on the inner end of the pinion (where there are no teeth) is rotatably supported in a hole R22 in the side flange R21 of the frame R2 and serves as a bushing for supporting the take-up shaft R1 on the frame R2. The pinion 3 is retained by a stopper R12 that is engaged with the rectangular shaft portion R11. The rectangular shaft portion R11 extends outwardly beyond the pinion 3 and through a shaft-receiving hole 63 in the retainer 6. The inner end of a spiral spring R71 (see FIG. 3) of the spring unit R7 is attached to the end of the shaft portion R11.

The pulley 1 is annular and has internal teeth 11 arranged to engage the teeth 31 of the pinion 3. The inner diameter of the pulley 1 is larger than the diameter of the pinion 3. The pulley 1 does not have an outer side flange. Its inner side flange 12 has a planar wall 13 along most of its circumference. A projection 14 extends outwardly from the flange 12 and has a notch 15 that receives a wire end 22, which is crimped on the end of a cable 21. The wire end 22 fastens the end of the cable 21 to the pulley 1. The cable 21 is wound by about ¾ turn around the pulley 1, extends out of the housing 5 through the notch 54, passes through a T-piece 24 and is attached to a piston 23 of the power source 2.

The power source 2, which is of a known type and is mounted by means of the T-piece 24 on the bracket 62 by a rivet 72 and a screw 73, comprises a cylinder 25, a gas generator 26 composed of gunpowder and an ignitor, a keeper 27, and a connector 28 of a starting device (not shown).

Figure 4A:
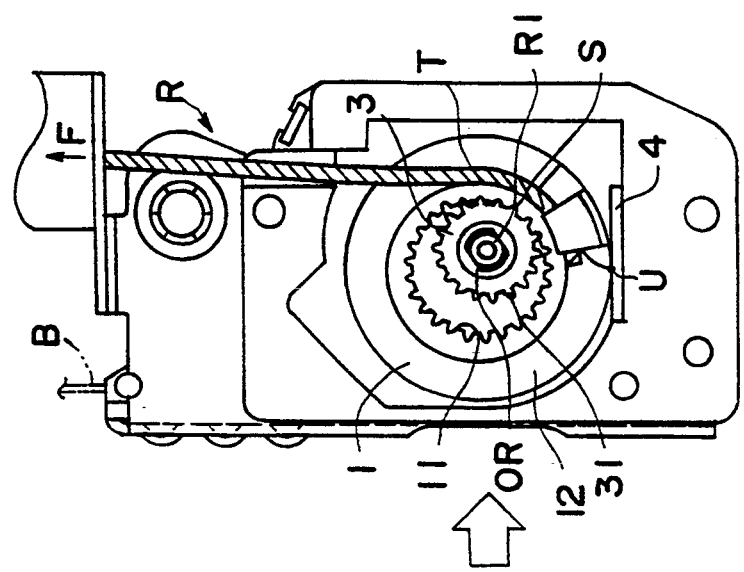
FIGS. 4A, 4B and 4C are side elevational views of the pretensioner unit of the first embodiment, showing its operation step by step.

In the following description of the operation of the embodiment, the positions (up and down, left and right) in the drawing figures are with respect to the figures to facilitate explanation, but the orientation of the pretensioner P is not limited to these positions. As shown in FIG. 4A, which shows the "set" condition, the pulley 1 is positioned downwardly within the pulley-receiving recess 53 with its inner side flange 12 supported by the guiding means 4, which extends into the pulley-receiving recess 53. The flange 12 is fastened to the side wall 51 of the housing 5 by shear pins 16 at two points (left and right). In that position, the teeth 31 of the pinion 3 and the internal teeth 11 of the pulley 1 are not engaged and are at a predetermined clearance L. The take-up shaft R1 can operate under the control of the spring unit R7 and the locking mechanism R5 in the normal manner.

Figure 4B:
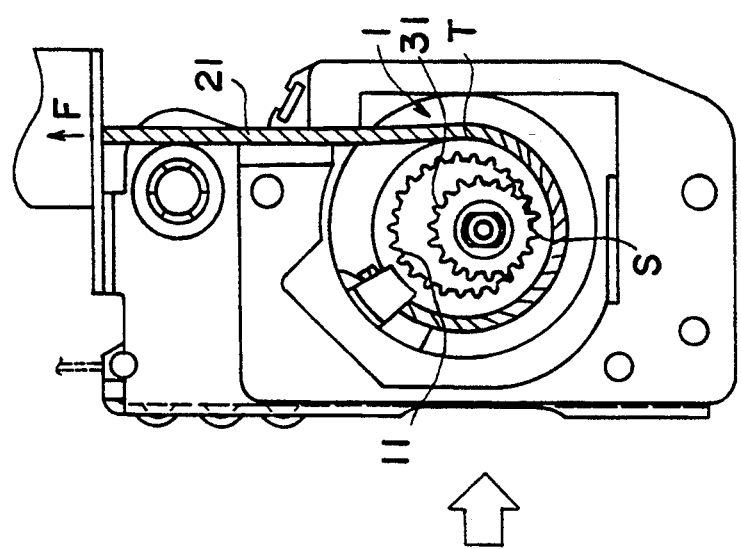

When a high acceleration occurs, such as in a vehicle collision, in the set condition, it is detected by a sensor (not shown), and the power source 2 is operated by a starting device (not shown). As shown in FIG. 4B, the cable 21 is pulled by a pulling force F in a direction shown by the arrow in the figure. The shear pins 16 break, and the pulley with the rope 21 wound on it starts rotating and is pulled upward. The pulley teeth 11 engage the pinion teeth 31 at a lower engaging point S. Because the pulley 1 is not restricted in upward and lateral movements, even when the tips of the teeth 31 and 11 collide, the engagement of the pinion teeth 31 and the pulley teeth 11 is assured since the pulley is moved laterally as it is rotated.

When the pulley teeth 11 and pinion teeth 31 are engaged as described above, the pulling force F acts as a moment to rotate the pulley 1 with the engaging point S between the engaged teeth as a center. The peripheral surface of the flange 12 of the pulley 1 engages and is supported by the upper surface of the guiding means 4, which constitutes a fixed reaction support point U. As a result, the position of the pulley 1 is maintained by the engaging point S and the reaction support point U and is rotated around a virtual center OR with the upper surface of the guiding means 4 as a guide.

Figure 5:
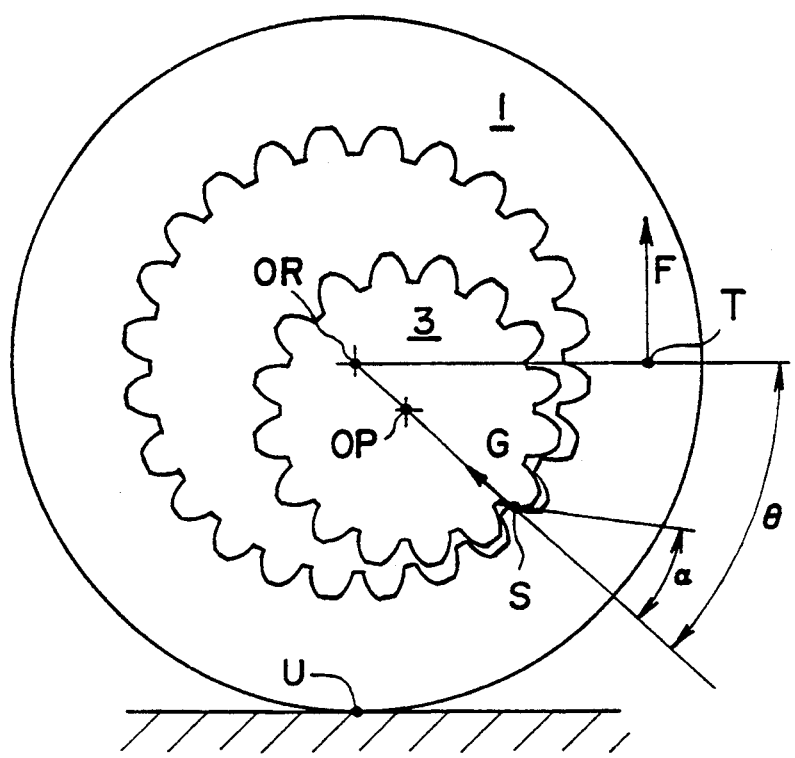
FIG. 5 illustrates the operating principle by schematically showing the engagement of the pinion and the pulley of the first embodiment.

The maintenance of engagement between the pulley and the pinion is shown diagrammatically in FIG. 5. A force tending to disengage the pulley from the pinion during rotation is generated at an addendum pressure angle $\alpha$. As is evident from the figure, if an engaging angle $\Theta$ is larger than the addendum pressure angle $\alpha$, a force G in a direction toward the pinion overcomes the force tending to disengage the teeth, and the engagement is maintained. Thus, the engaging point S should be selected in such manner that the engaging angle $\Theta$ does not exceed the addendum pressure angle $\alpha$. However, if the engaging angle $\Theta$ is made too large, i.e., closer to 90° C., the pulling force F is consumed by the force G in the engaging direction, and the moment tending to rotate the pinion 3 is decreased. Thus, the transmission of torque from the pulley 1 to the pinion 3 is reduced. Therefore, it is preferable that the engaging angle $\Theta$ is made close to the addendum pressure angle $\alpha$ as shown in the figure. By so doing, friction resistance at the reaction support point U during rotation of the pulley 1 is minimized, and the engagement of gears is maintained. Thus, the pulling force F applied by the cable can be efficiently converted to a force that rotates the take-up shaft.

Figure 4C:
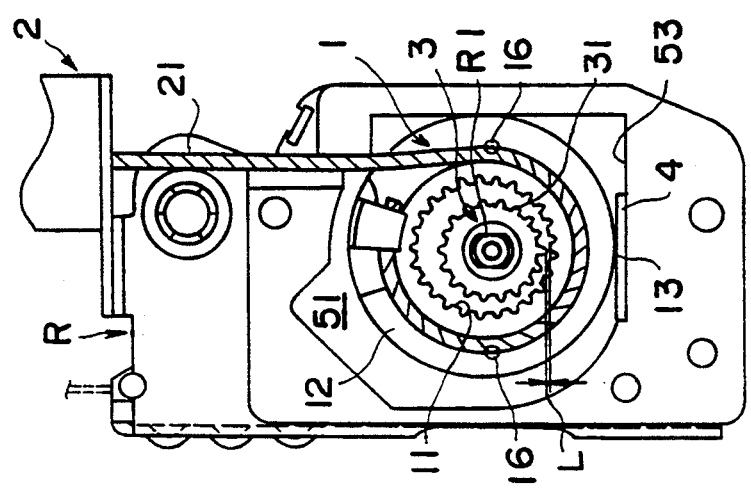

Referring now to FIG. 4C, rotation of the pulley 1 is transmitted to the take-up shaft R1 through the pinion 3, and a length of the belt B is wound onto the retractor reel. The winding of the belt takes place instantaneously before any forward movement of the occupant due to inertia.

The present invention is not limited to the above-described embodiment, and various modifications can be made according to actual conditions and the selection of component materials within the scope of the claims attached hereto. For example, in the above embodiment, the power source 2 is of gas pressure cylinder type, whereas it is possible to adopt a powerful spring as a power source. Also, gears are used in the embodiment as the means for engaging the pulley 1 with the take-up shaft R1, whereas the engaging means is not limited to gears.

Figure 6:
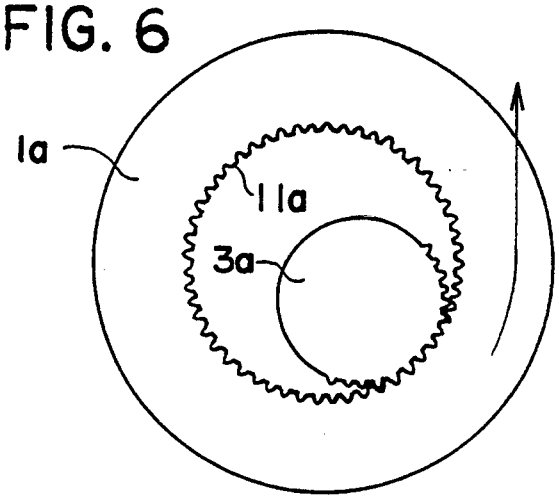
FIG. 6 is a side view schematically illustrating a second embodiment having a modified engaging means.

FIG. 6 shows a second embodiment with modified engaging means. In this example, serrations 11a are formed on the inner periphery of the pulley 1a. The member 3a is made of softer material than the pulley 1a, such as diecast zinc. During operation, the serrations 11a of the pulley 1a engage the outer periphery of the member 3a and form engaging serrations in the member by plastic deformation of the pinion.

Figure 7:
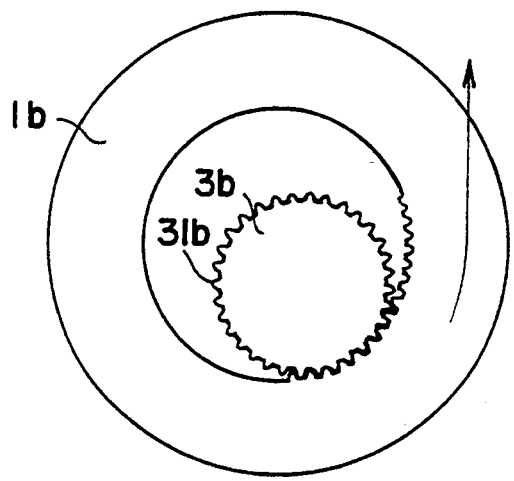
FIG. 7 is a side view schematically illustrating an engaging part of a third embodiment of the invention with another modified engaging means.

FIG. 7 represents a third embodiment with modified engaging means, where, by reversing the above second embodiment, serrations 31b are formed on the outer periphery of the member 3b, and the pulley 1b is made of diecast zinc. By such arrangement, engagement is attained by plastic deformation of the pulley similar to the above embodiment.

Figure 8:
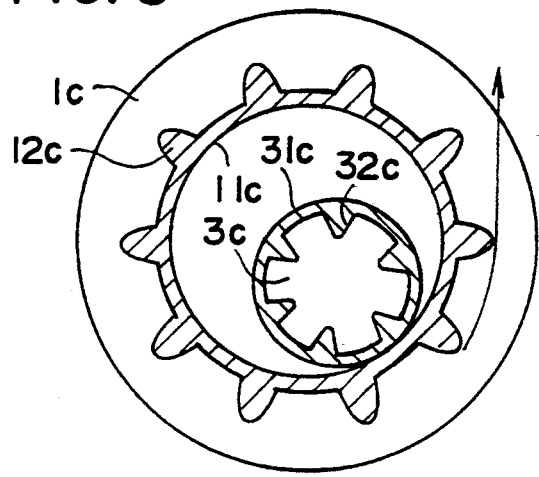
FIG. 8 is a side view schematically illustrating an engaging part of a fourth embodiment having a modified engaging means.

FIG. 8 shows a fourth embodiment with modified engaging means. In this example, friction materials 31c and 11c made of synthetic rubber are used in order to increase the friction coefficients of the respective engaging surfaces of the member 3c and the pulley 1c. To prevent disengagement, the pulley and pinion have deep radial grooves 12c and 32c to obtain higher friction forces.

In a pretensioner according to the invention, there is no need to provide stepwise control of the engagement of the driving member with the retractor shaft and the rotation of the driving members, and no moving guiding means is required for this purpose. Thus, it is possible to provide a retractor shaft-rotating type pretensioner that can maintain the engagement utilizing the force acting on the driving member and the reaction force of engagement of the driving member with fixed guiding means, and to transmit torque efficiently with fewer component parts.

We claim:

1. A retractor shaft-rotating type seat belt pretensioner for imparting pretension to a seat belt by rotating a take-up shaft of a belt retractor, the pretensioner including a driving member engageable with a driven member on the take-up shaft and a power source coupled to the driving member and adapted to rotate the driving member about an axis of rotation by applying an operating force to the driving member at an operating point, the driving member being engageable with the driven member on the take-up shaft at an engaging point by translational movement of the axis of rotation of the driving member by the operating force of the power source, characterized in that the driving member is annular and has an inner surface engageable with an outer surface of the driven member on the take-up shaft, and the pretensioner includes guide means for supporting an outer surface of the driving member when the driving member is engaged with the driven member on the take-up shaft at a support point against the reaction force due to a rotary moment applied to the driving member by the operating force at the engaging point where the driving member engages the driven member on the take-up shaft, the support point being on the opposite side of the engaging point from the operating point where the operating force of the power source acts on the driving member and the guide means being in a position such that the guide means does not impede movement of the axis of rotation of the driving member or of the driving member prior to engagement of the driving member with the driven member on the take-up shaft.

2. A retractor shaft-rotating type seat belt pretensioner according to claim 1 and further characterized in that the inner surface of the driving member and the outer surface of the driven member on the take-up shaft are gears.

* * * * *